(12) United States Patent
Bierjon et al.

(10) Patent No.: US 7,607,723 B2
(45) Date of Patent: Oct. 27, 2009

(54) MOTOR VEHICLE FRONT UNIT ASSEMBLY

(75) Inventors: Didier Bierjon, Audincourt (FR); Raphael Mary, Schelldorf (DE)

(73) Assignee: Faurecia Bloc Avant, Nanterre (FR)

( * ) Notice: Subject to any disclaimer, the term of this patent is extended or adjusted under 35 U.S.C. 154(b) by 126 days.

(21) Appl. No.: 11/659,078

(22) PCT Filed: Jul. 6, 2005

(86) PCT No.: PCT/FR2005/001749
§ 371 (c)(1),
(2), (4) Date: Apr. 2, 2007

(87) PCT Pub. No.: WO2006/024717
PCT Pub. Date: Mar. 9, 2006

(65) Prior Publication Data
US 2008/0001436 A1 Jan. 3, 2008

(30) Foreign Application Priority Data
Aug. 2, 2004 (FR) .................................. 04 08530

(51) Int. Cl.
*B60Q 1/04* (2006.01)
*B62D 25/08* (2006.01)
(52) U.S. Cl. .................. 296/203.02; 362/507
(58) Field of Classification Search ............ 296/193.09, 296/193.1, 203.01, 203.02, 203.04; 362/505, 362/506, 507
See application file for complete search history.

(56) References Cited

U.S. PATENT DOCUMENTS

| | | | |
|---|---|---|---|
| 6,196,624 B1 * | 3/2001 | Bierjon et al. | 296/193.09 |
| 6,293,615 B1 * | 9/2001 | Tarahomi | 296/193.09 |
| 6,523,886 B2 * | 2/2003 | Hoffner et al. | 296/203.02 |
| 6,695,396 B1 * | 2/2004 | Schwab | 296/203.02 |
| 6,729,008 B2 * | 5/2004 | Nishijima | 29/458 |
| 6,923,495 B2 * | 8/2005 | Kishikawa et al. | 296/193.09 |
| 7,007,385 B2 * | 3/2006 | Tarahomi | 29/897.2 |
| 7,014,257 B2 * | 3/2006 | Lazzeroni et al. | 296/203.02 |
| 7,036,873 B2 * | 5/2006 | Pommeret et al. | 296/191 |
| 7,144,074 B2 * | 12/2006 | Lee | 296/203.02 |
| 7,188,892 B2 * | 3/2007 | Tazaki et al. | 296/193.09 |
| 7,338,191 B2 * | 3/2008 | Konno et al. | 362/507 |
| 7,347,489 B2 * | 3/2008 | Ziaja et al. | 296/193.03 |
| 7,410,209 B2 * | 8/2008 | Clapie | 296/193.09 |
| 2002/0117875 A1 * | 8/2002 | Hoffner et al. | 296/194 |

(Continued)

FOREIGN PATENT DOCUMENTS

DE 199 46 995 4/2000

(Continued)

*Primary Examiner*—Glenn Dayoan
*Assistant Examiner*—Paul A Chenevert
(74) *Attorney, Agent, or Firm*—Young & Thompson

(57) ABSTRACT

A motor vehicle front unit assembly (1) comprising a rigid front surface (10), a bumper skin (15), two flexible beams (30) extending laterally, whereof one first end is connected to the front surface (10) and a second end is connected to a front part (2a) of a body fender (2), and two optical units (20). The bumper skin (15) is fixed on the first end of each flexible beam (30) and each end is adjustable along a first axis X and a second axis Y on the front face (10) to adjust each optical unit (20) relative to the bumper skin (15), the third axis Z being nonadjustable.

13 Claims, 4 Drawing Sheets

U.S. PATENT DOCUMENTS

| | | | |
|---|---|---|---|
| 2004/0174047 A1* | 9/2004 | Henderson et al. | 296/193.09 |
| 2005/0023864 A1* | 2/2005 | Lazzeroni et al. | 296/203.02 |
| 2005/0088015 A1* | 4/2005 | Kishikawa et al. | 296/193.09 |
| 2005/0275250 A1* | 12/2005 | Wada | 296/203.02 |
| 2007/0182211 A1* | 8/2007 | Sub | 296/193.09 |
| 2008/0185872 A1* | 8/2008 | Povinelli et al. | 296/193.09 |
| 2008/0231084 A1* | 9/2008 | Mishima | 296/203.02 |

FOREIGN PATENT DOCUMENTS

| | | | |
|---|---|---|---|
| DE | 19946995 A1 * | 4/2000 | |
| EP | 1 232 932 | 8/2002 | |
| EP | 1232932 A1 * | 8/2002 | |

\* cited by examiner

MOTOR VEHICLE FRONT UNIT ASSEMBLY

BACKGROUND OF THE INVENTION

The present invention relates to a motor vehicle front unit assembly.

DESCRIPTION OF THE RELATED ART

The front units of motor vehicles generally comprise a front face which has a central portion and two lateral portions, a bumper and a bumper skin which forms a fairing for this bumper, two beams each extending from the central portion, to which it is fixed, to a respective lateral portion and forming support members for the bumper skin, and two optical units (i.e., headlight or headlamp). Each optical unit is supported by a respective lateral portion and has a peripheral lateral portion which is suitable for co-operating with a complementary recess of a respective front wing portion.

A major problem encountered by automotive manufacturers involves positioning the optical units precisely relative to the outer elements constituted by the wings and the bumper skin. This adjustment is significant owing to the fact that a defect in terms of surface continuity of the visible portion of the optical unit, that is to say, of the light, of the corresponding wing and the bumper skin significantly impairs the aesthetic quality of the vehicle. Furthermore, a precise adjustment of the position of the optical unit relative to the wing and the bumper skin is difficult to maintain between the operation for mounting the optical units on the front face and the operation for assembly of the equipped front unit on the body of the motor vehicle.

These difficulties have been exacerbated by the standardisation of unitary optical units which integrate the indicating function (i.e., turn signal function), whilst the portion which forms the indicator was previously adjustable relative to the main portion of the optical unit so that it was relatively straightforward to compensate for positioning tolerances.

In the case of unitary optical units which integrate the indicator function, each optical unit is generally fixed at four points to the front face which constitutes a rigid component.

After assembling each optical unit, they are mounted on the body of the vehicle and the front end of the corresponding body wing is fixed to each of these optical units.

In a subsequent operation, the automotive manufacturer carries out the adjustment of the position of the optical unit relative to the wing by acting on two points for fixing the optical unit to the front face.

The major disadvantage of this operating method is in particular this reworking operation at the end of assembly, which involves adjusting the position of the optical unit. Furthermore, this fine adjustment must be carried out for all vehicles taking into account the production and assembly tolerances of the various elements involved. Since these elements are also susceptible to deformations to a greater or lesser extent, the aligned surface states obtained with these adjustments are not stable in the long term and may require additional adjustments.

To this end, document EP-A-1 232 932 discloses a motor vehicle front unit assembly which comprises a front face, which has a central portion and two lateral portions, a bumper skin, two flexible beams which extend laterally and which form supports for the bumper skin, each of which has a first end which is connected to the central portion and a second end which is intended to be connected to a front wing portion of the body of the vehicle, and two optical units, each of which is rigidly fixed to a respective beam.

The structure described in this document allows automatic and permanent positioning of the visible contours of the optical units relative to the corresponding wing ends and the bumper skin.

At the same time, this structure provides precise relative positioning of the wing ends and the bumper skin. However, it may also be desirable, in order to improve the aesthetic qualities of the vehicle, to provide a continuity in terms of appearance of the optical units and the bumper skin with other body elements, such as, for instance, the bonnet of the motor vehicle.

Furthermore, some bumper skins have shapes which surround each optical unit over a portion of the inner perimeter thereof so that it is necessary to be able to take up the clearance between the bumper skin and the optical units in this inner portion.

SUMMARY OF THE INVENTION

The object of the invention is therefore to provide a motor vehicle front unit assembly in the form of a pre-assembled module whose various elements formed by the optical units and the bumper skin can be automatically adjusted and locked in position in order to provide a mutual continuity in terms of appearance.

The invention therefore relates to a motor vehicle front unit assembly, comprising:
- a rigid front face which has a central portion and two lateral portions,
- a bumper skin,
- two flexible beams which extend laterally, a first end of which is connected to the central portion of the front face and a second end of which is connected to a front portion of a body wing, and
- two optical units, each of which is rigidly fixed to a respective flexible beam, characterised in that the bumper skin is fixed to the first end of each flexible beam and each first end can be adjusted along a first axis Z and along a second axis Y on the central portion of the front face for an adjustment of each optical unit relative to the bumper skin.

According to other features of the invention:
- the adjustment along the first axis Z of the first end of each beam is obtained using indexing means which comprise a sleeve which is fixedly joined to the front face and which extends perpendicularly relative to this front face and a member which is provided on the beam and which extends perpendicularly relative to this beam, and which is capable of sliding axially in the sleeve, the member being locked by the sleeve along the first axis Z,
- the sleeve comprises means for locking the member along a third axis X,
- each beam comprises means for indexing the bumper skin along the first axis Z and along the third axis X,
- the means for indexing the bumper skin are formed by at least one hollow portion which is provided on the upper portion of the beam and which extends transversely in the general direction of this beam and by at least one complementary protruding portion which is provided on the upper portion of the bumper skin,
- each beam comprises a flexion zone which is arranged between the first end and the fixing of the corresponding optical unit, and
- the flexion zone is formed by a substantially vertical recess which is provided on the beam.

BRIEF DESCRIPTION OF THE DRAWINGS

The invention will be better understood from a reading of the following description, given by way of example and with reference to the appended drawings, in which.

DESCRIPTION OF THE PREFERRED EMBODIMENT

Figure 1:
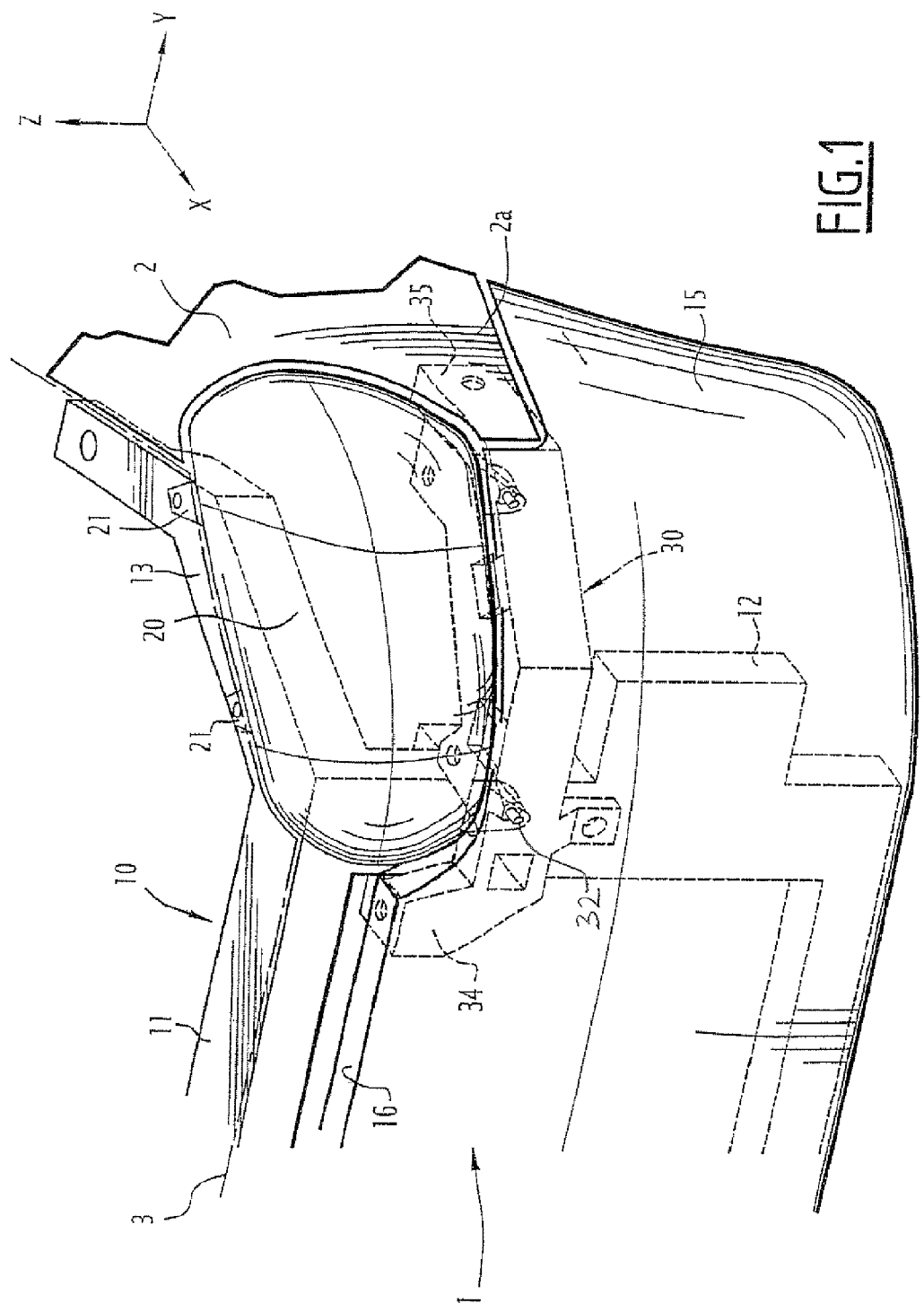
FIG. 1 is a perspective schematic view of a front unit assembly in accordance with the invention.
Figure 2:
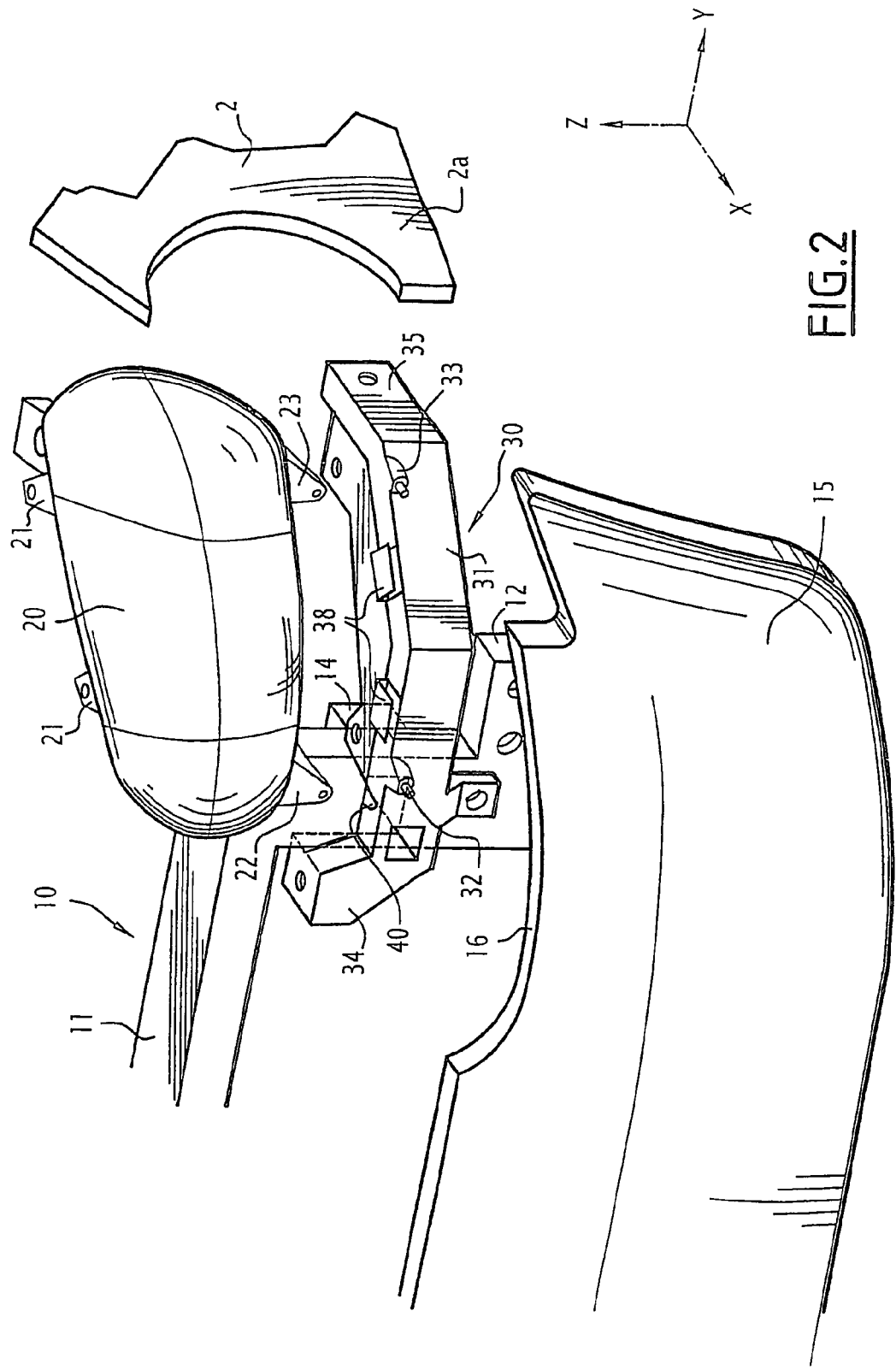
FIG. 2 is an exploded, schematic perspective view of the various elements which form the front unit assembly in accordance with the invention.

FIGS. 1 and 2 schematically illustrate a front portion of a motor vehicle comprising a front unit assembly 1 which is partially illustrated, a front end 2a of a body wing 2 and a front end 3 of a bonnet.

FIGS. 1 and 2, and FIGS. 3 and 4, have been orientated along three axes X, Y and Z which correspond to the normal orientation of a motor vehicle, that is to say, the longitudinal axis X which is orientated in the direction of forward travel, the transverse axis Y which is orientated from right to left, from the viewpoint of the driver, and the vertical axis Z which is orientated from bottom to top, respectively. All the terms used in the remainder of the description, which may indicate a direction or a position, must be understood with reference to this system of axes.

The front portion of the vehicle illustrated in FIGS. 1 and 2 is symmetrical or almost symmetrical relative to a vertical centre plane of the vehicle so that, for reasons of simplification, the following description will be given for one side of this front portion, the other side being identical.

Figure 3:
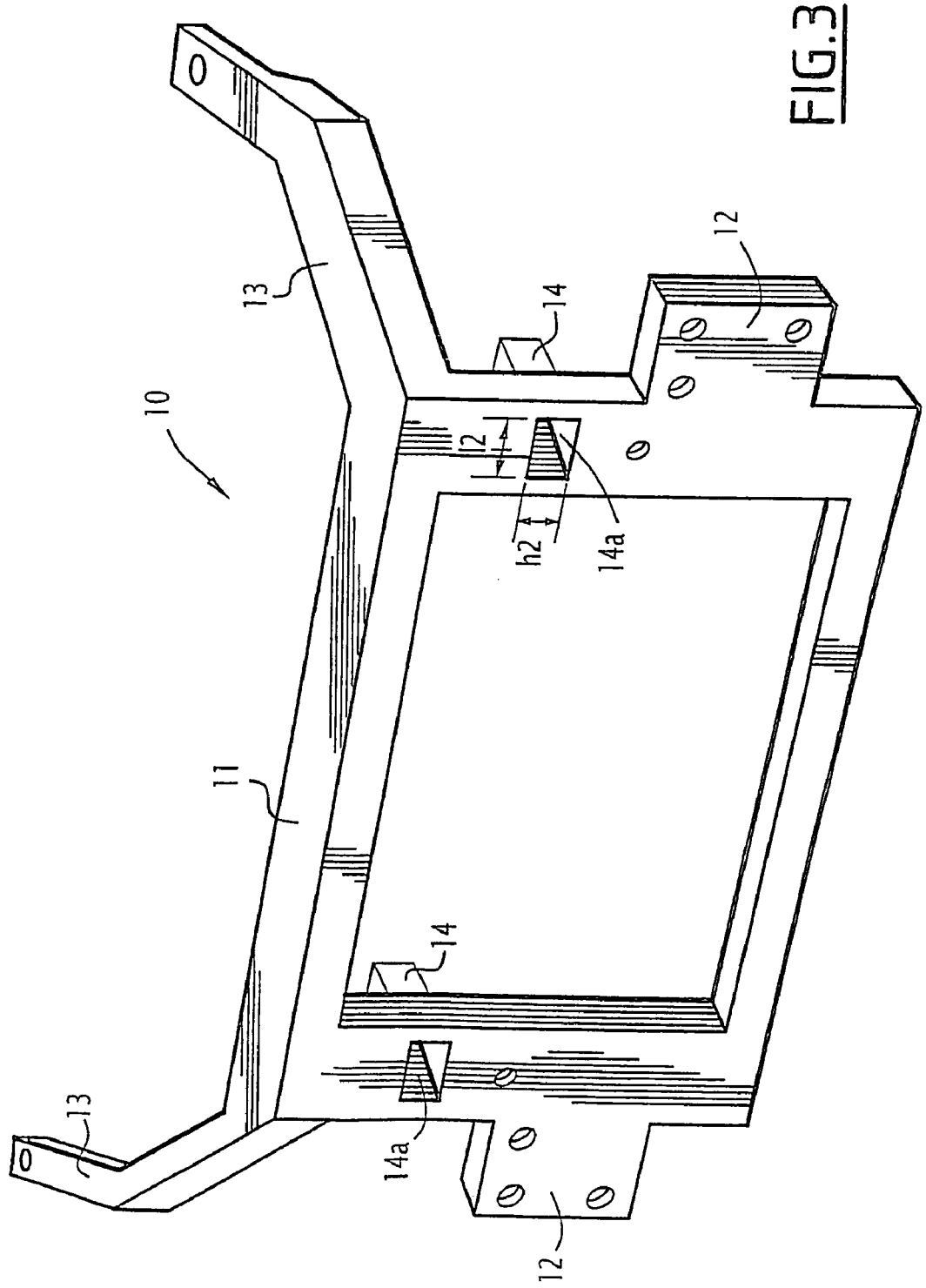
FIG. 3 is a schematic perspective view of the front face of the front unit assembly in accordance with the invention.

The front unit assembly 1 of the vehicle comprises a substantially rigid structure which is constituted by a front face which is generally designated 10 and which has a central portion 11 which is generally in the form of a frame and, at each side, a lateral portion 12, as illustrated in FIG. 3.

The front unit assembly 1 also comprises a bumper skin 15 which is produced, for example, from a component of plastics material and which is arranged over the entire width of the front face 10, as illustrated in FIG. 1, laterally extending beyond the lateral portions 12 of the front face 10 and pressing on an edge of the front end 2a of the wing 2 so as to be aligned therewith.

The front unit assembly 1 further comprises, at each lateral side, an optical unit 20 which is mounted on the front face 10 in complementary shapes which are provided in the wing 2, the bonnet 3 and the bumper skin 15, below an upper extension 13 of the front face 10 and above an upper edge 16 of the bumper skin 15, as illustrated in FIGS. 1 and 2.

The optical unit 20 is fixed to the lateral extension 13, for example, by means of two lugs 21.

Figure 4:
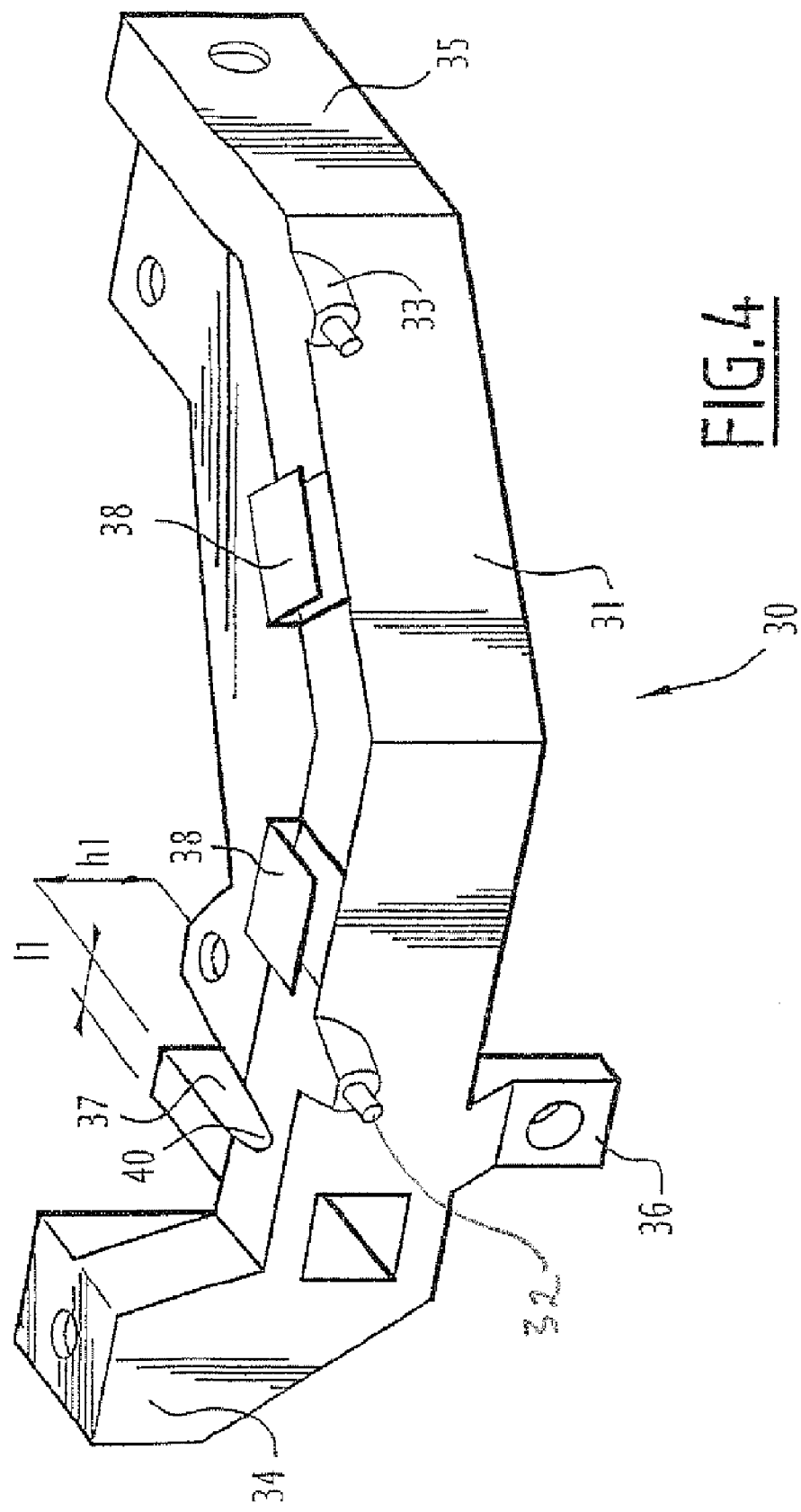
FIG. 4 is a perspective schematic view of a flexible beam of the front unit assembly in accordance with the invention.

The front unit assembly 1 also comprises, at each lateral side, a flexible and curved beam which is generally designated 30 and which is illustrated on a larger scale in FIG. 4. Each flexible beam 30 extends substantially laterally in the direction of the bumper skin 15 and comprises a central portion 31 whose front face is provided with a first pin 32 which is intended to co-operate with a first lower lug 22 of the optical unit 20 for indexing this optical unit 20 along the axes X and Z and a second pin 33 which is intended to co-operate with a second lower lug 23 of the optical unit 20 for indexing this optical unit 20 along the axes XYZ.

The flexible beam 30 comprises a first end 34 which is connected to the central portion 11 of the front face 10 and to which the upper edge 16 of the bumper skin 15 is also fixed in order to obtain a positioning of this bumper skin 15 along axis Z. The flexible beam 30 comprises a second end 35 which is connected to the front portion 2a of the body wing 2, as illustrated in FIG. 1. The central portion 31 of the flexible beam 30 comprises, on the lower edge thereof, a lug 36 for fixing to the central portion 11 of the front face 10.

Generally, the first end 34 of each flexible beam 30 can be adjusted along a first axis Z and along a second axis Y on the central portion 11 of the front face 10 for an adjustment of each optical unit 20 relative to the bumper skin 15.

To this end, the adjustment along these two axes is obtained using indexing means which comprise a hollow sleeve 14 which, in the embodiment illustrated in FIG. 3, is fixedly joined to the central portion 11 of the front face 10 and extends perpendicularly relative to this front face 10, protruding from the front face towards the rear along the longitudinal axis thereof which is directed substantially along the longitudinal axis X of the vehicle. This sleeve 14 comprises an elongate hole 14a in the direction X of the axis of the sleeve 14.

For example, the hole 14a has a rectangular cross-section, the largest sides of which are horizontal. The hole 14a may have other shapes, such as, for example, an oblong shape.

Furthermore, the indexing means comprise a member 37 which is provided on the beam 30 and which extends perpendicularly relative to this beam, towards the rear of the motor vehicle, along the longitudinal axis thereof which is orientated substantially along the longitudinal axis X of this vehicle. The member 37 is capable of sliding axially in the hole 14a of the hollow sleeve 14.

In the embodiment illustrated in FIG. 4, the member 37 has a rectangular cross-section whose height h1 is substantially equal to the height h2 of the hole 14a of the sleeve 14 and whose width l1 is less than the width l2 of this hole 14a in order to allow the member 37 and consequently the corresponding flexible beam 31 to be able to be displaced along the transverse axis Y, all being locked along the axis Z.

Each sleeve 14 also comprises means (not illustrated) for locking the corresponding member 37 along the axis X, which allows the member 37 and the sleeve 14 to be fixedly joined in a definitive manner with a possibility of disassembly. These locking means are constituted by any appropriate device of the conventional type, such as, for example, a screw/nut pair or a pin.

Furthermore, each flexible beam 30 comprises means for indexing the bumper skin 15 along the axes X and Z. These indexing means which are illustrated in particular in FIG. 4 comprise at least one hollow portion 38 which is provided on the upper portion of the central portion 31 of the beam 30. In the embodiment illustrated in this Figure, the hollow portion is formed by at least one channel 38 and, for example, by two channels 38 which extend transversely in the general direction of the beam 30.

These indexing means comprise at least one complementary protruding portion which is provided at the upper portion of the bumper skin and which, in the embodiment illustrated in FIGS. 1 and 2, is constituted by the upper edge 16 of the bumper skin 15, in order to fasten this bumper skin 15 to each beam 30, with a possibility of relative adjustment movement in the general direction of this beam 30, that is to say, along the axis Y.

Each flexible beam 30 optionally comprises a flexion zone 40 which is arranged between the first end 34 and the central portion 31 and, more particularly, between the first end 34 for fixing the bumper skin 15 and the central portion 31 on which the corresponding optical unit 20 is mounted. This flexion zone is formed, for example, by a substantially vertical recess 40. This recess 40 is advantageous in particular when the end portion 2a of the wing 2 fixed to the second end 35 of the corresponding beam 30 is rigid.

The invention claimed is:

1. Motor vehicle front unit assembly, comprising:
 a rigid front face (10) which has a central portion (11) and two lateral portions (12, 13),
 a bumper skin (15, 16),
 two flexible beams (30) which extend laterally, a first end (34) of which is connected to the central portion (11) of the front face (10) and a second end (35) of which is connected to a front portion (2a) of a body wing (2), and
 two optical units (20), each of which is rigidly fixed to a respective flexible beam (30), wherein,
 there is a longitudinal first axis X extending along the length of the vehicle, a transverse second axis Y along the central portion (11) of the front face (10), and a vertical third axis Z, and
 the bumper skin (15) is fixed to the first end (34) of each flexible beam (30) and each first end (34) can be adjusted along the first axis X and along the second axis Y on the central portion (11) of the front face (10) for an adjustment of each optical unit (20) relative to the bumper skin (15, 16), the skin being locked and non-adjustable along the third axis Z.

2. Front unit assembly according to claim 1, characterised in that each beam (30) comprises a flexion zone (40) which is arranged between the first end (34) and the fixing of the corresponding optical unit (20).

3. Front unit assembly according to claim 2, characterised in that the flexion zone is formed by a substantially vertical recess (40).

4. Front unit assembly according to claim 1, characterised in that each beam (30) comprises means (38) for indexing the bumper skin (15) along the first axis X and along the second axis Y.

5. Front unit assembly according to claim 4, characterised in that each beam (30) comprises a flexion zone (40) which is arranged between the first end (34) and the fixing of the corresponding optical unit (20).

6. Front unit assembly according to claim 4, characterised in that the means for indexing the bumper skin (15) are formed by at least one hollow portion (38) which is provided on the upper portion of the beam (30) and which extends transversely in the general direction of this beam (30) and by at least one complementary protruding portion (16) which is provided on the upper portion of the bumper skin (15).

7. Front unit assembly according to claim 6, characterised in that each beam (30) comprises a flexion zone (40) which is arranged between the first end (34) and the fixing of the corresponding optical unit (20).

8. Front unit assembly according to claim 1, wherein the adjustment along the first axis X of the first end (34) of each flexible beam (30) is obtained using indexing means which comprise a sleeve (14) which is fixedly joined to the front face (10) and which extends perpendicularly relative to this front face (10) and a member (37) which is provided on the beam (30) and which extends perpendicularly relative to this beam (30), and which is capable of sliding axially in the sleeve (14), the member (37) being locked by the sleeve (14) along the third axis Z.

9. Front unit assembly according to claim 8, characterised in that each beam (30) comprises means (38) for indexing the bumper skin (15) along the first axis X and along the second axis Y.

10. Front unit assembly according to claim 8, characterised in that each beam (30) comprises a flexion zone (40) which is arranged between the first end (34) and the fixing of the corresponding optical unit (20).

11. Front unit assembly according to claim 8, characterised in that the sleeve (14) comprises means for locking the member (37) along the third axis Z.

12. Front unit assembly according to claim 11, characterised in that each beam (30) comprises means (38) for indexing the bumper skin (15) along the first axis X and along the second axis Y.

13. Front unit assembly according to claim 11, characterised in that each beam (30) comprises a flexion zone (40) which is arranged between the first end (34) and the fixing of the corresponding optical unit (20).

* * * * *